Jan. 7, 1930.  E. J. SWEETLAND  1,742,325
AIR CONDITIONING DEVICE
Filed Feb. 25, 1920  4 Sheets-Sheet 1
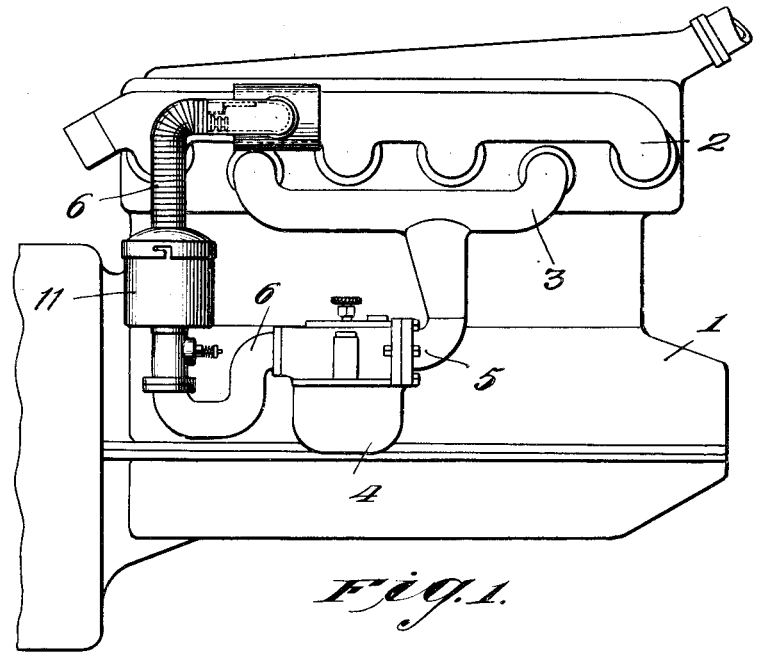
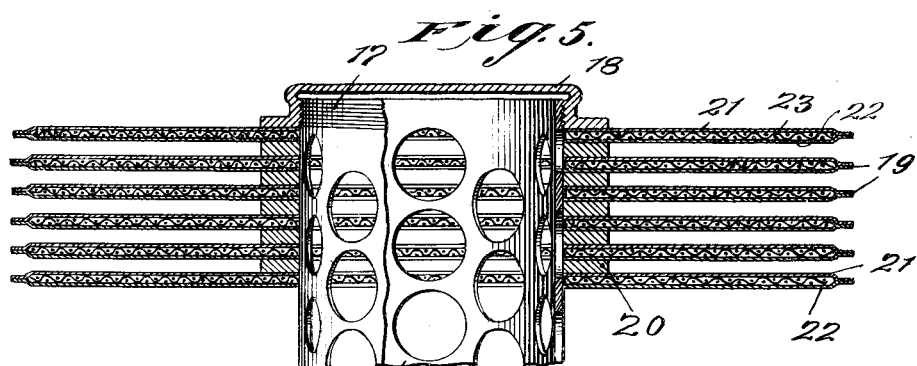
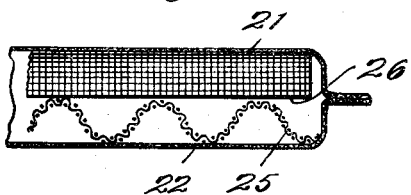
INVENTOR
Ernest J. Sweetland
BY
William P. Hammond
ATTORNEY

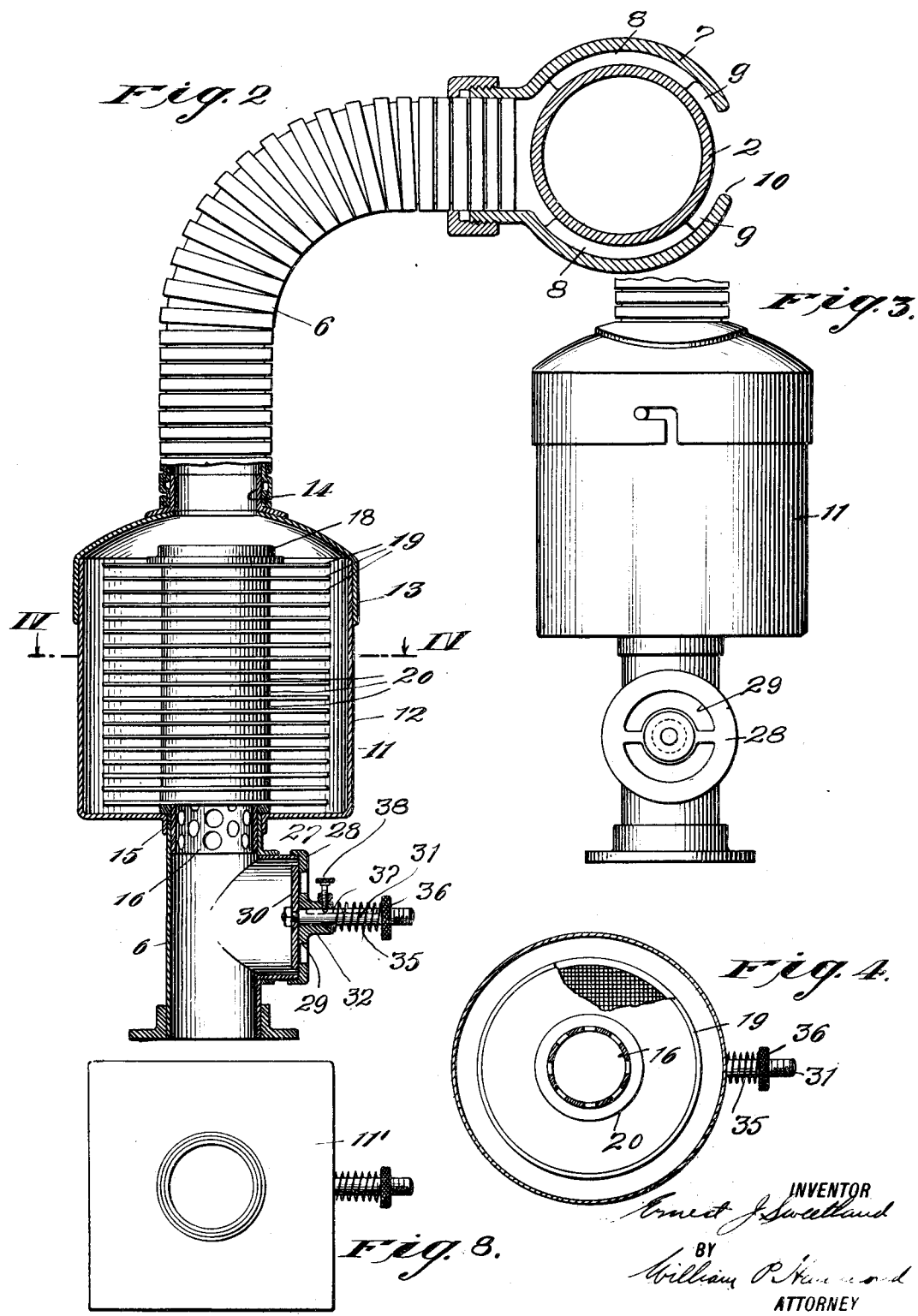

Jan. 7, 1930.  E. J. SWEETLAND  1,742,325
AIR CONDITIONING DEVICE
Filed Feb. 25, 1920  4 Sheets-Sheet 3

INVENTOR
Ernest J. Sweetland
BY
William P. Hammond
ATTORNEY

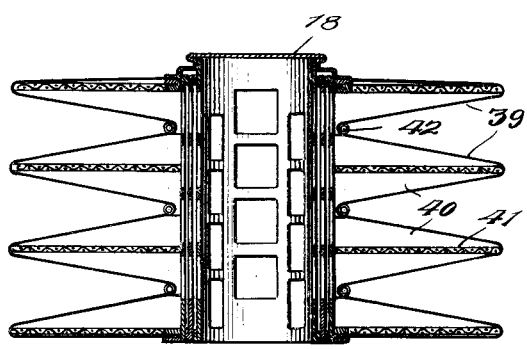
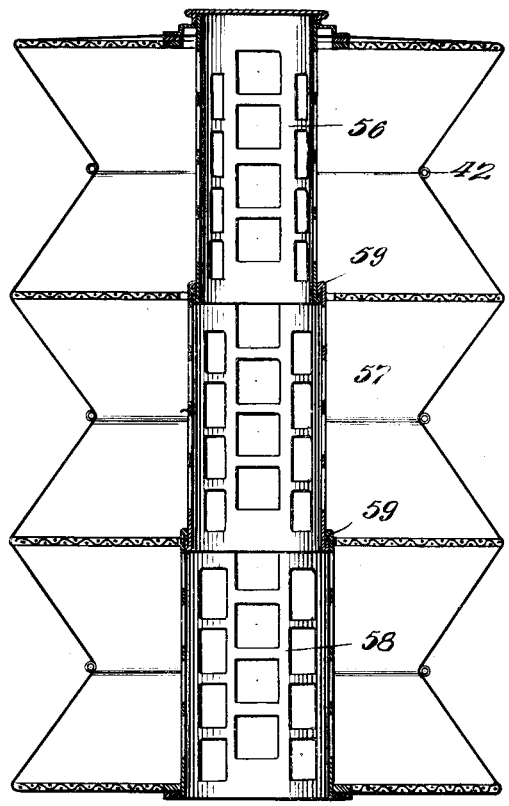
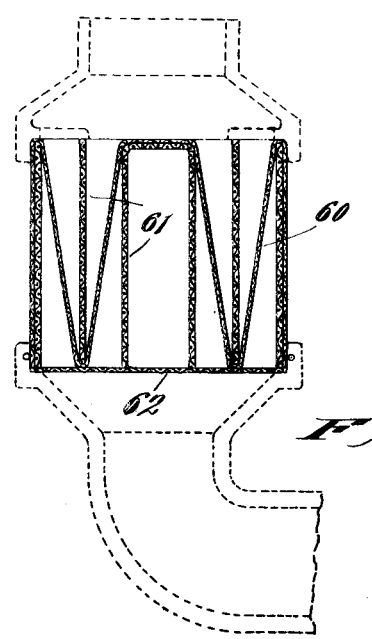

Patented Jan. 7, 1930

1,742,325

UNITED STATES PATENT OFFICE

ERNEST J. SWEETLAND, OF MONTCLAIR, NEW JERSEY

AIR-CONDITIONING DEVICE

Application filed February 25, 1920. Serial No. 361,215.

My invention relates to improvements in air conditioning devices, and has for its object the conditioning and filtering of the air supplied to the carburetor of an internal combustion engine in such a manner as to insure an efficient operation of the engine.

In order to insure the highest efficiency in the operation of internal combustion engines, the air which is supplied to the carbureter, and which forms an explosive mixture with the vaporized fuel, should be dry and warm, and free from dust or other impurities. Furthermore, the amount of air supplied to the carbureter should always be sufficient to meet the demands of the engine under all operating conditions, and the supply of air should be constant, as any interruption in the supply of air, or any decrease in the quantity supplied below the quantity required, will necessarily lessen the efficiency of the engine.

In accordance with my invention, I provide a filter through which the air supplied to the carbureter must pass, and which is preferably so constructed that an extensive filtering area is presented to the air passing therethrough, whereby the filtering of a large quantity of air may be effected within a short period of time, thus insuring a constant supply of air to the carbureter in sufficient quantity to meet the varying demands of the engine at all times. In order to keep the filtering area dry, thereby maintaining an efficient operation thereof, I provide for the heating and drying of the air before it enters the filter. This preliminary heating and drying of the air, furthermore, is highly advantageous in the forming of the explosive mixture with the vaporized fuel, as such mixture is more quickly and efficiently formed when the air is hot and dry, than when it is comparatively cool and moist. I further provide means for introducing unfiltered air into the air inlet passage between the filter and the carbureter, in order to insure the proper supply of air to the carbureter, in case the filtering area should become clogged by dirt or moisture, or otherwise rendered inefficient, to such an extent that the proper quantity of air cannot pass therethrough.

In the accompanying drawings, forming a part of this application, wherein are shown several illustrative embodiments of my invention,.

Figure 1 is a side elevation of an internal combustion engine having applied thereto a preferred form of apparatus constructed according to and embodying my invention;

Figure 2 is an enlarged sectional view of the apparatus shown in Figure 1;

Figure 3 is an elevation of the filter and relief valve, as seen from the right in Figure 2;

Figure 4 is a sectional view, taken on the line IV—IV of Figure 2, part of the filtering area being broken away;

Figure 5 is an enlarged sectional view of the upper portion of the filter body and its associated parts, shown in Figure 2;

Figures 6 and 7 are detail sectional views showing modified constructions of the filter elements;

Figure 8 is a plan of a modified form of filter;

Figure 13 is a sectional view of an extensible and contractible filter body mounted upon a telescopic tube, the parts being shown in their contracted positions;

Figure 14 is a sectional view thereof, the parts being shown in their extended positions, and Figure 15 is a sectional view of still another form of filter body.

Figure 9:
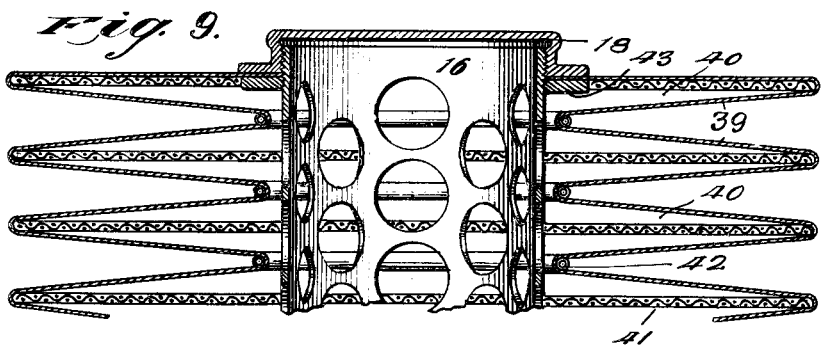
Figure 9 is a view similar to Figure 5 showing a modified form of filter body.

Referring to the drawings, 1 indicates an internal combustion engine of any suitable type, having an exhaust manifold 2 and an intake manifold 3, to which a suitable carbureter 4 is connected by means of a conduit 5. The carbureter 4 is connected to one end of an air inlet conduit 6, the other end of which is in communication with the interior of a sleeve 7 supported upon the exhaust manifold 2 and spaced therefrom by spacing members 8 to provide air passages 9 affording communication between the air inlet conduit 6 and an air inlet opening 10 formed in the sleeve 7. It is of course understood that the air inlet opening 10 and the passages 9 are of sufficient size to permit the passage therethrough of the maximum quantity of air necessary for the proper operation of the engine 1.

Interposed in the air inlet conduit 6 between the ends thereof is a filter 11 which, as shown in Figures 1 to 5, includes a cylindrical casing comprising a body portion 12 and a cover 13 provided with outlet and inlet openings, respectively. The cover 13 and body portion 12 of the filter casing are provided with outwardly extending annular flanges 14 and 15 which frictionally engage the upper and lower portions of the conduit 6 to maintain the filter 11 in position.

Positioned within the filter casing is a perforated tube 16 having its lower end in frictional engagement with the inner wall of the conduit 6, and having an exterior thread 17 at its upper end adapted to receive an interiorly threaded cap 18 which serves as a closure for the upper end of the tube 16. Removably supported upon the tube 16 are a plurality of alternately disposed filter elements 19 and spacing elements 20, constituting the filter body. As shown in Figure 5, the filter elements 19, which are annular in form, comprise upper and lower filtering surfaces 21 and 22, of any suitable filtering material, spaced from one another by suitable spacing means 23, to form drainage chambers communicating with the perforations in the tube 16. The spacing members 23 are so constructed as to perform the desired function without offering appreciable resistance to the flow of the air through the filter elements, and are preferably formed of wire netting, as indicated in Figure 5, but they may be formed of any foraminous or reticulated material, such as expanded metal, or they may be of any suitable construction to maintain the filtering areas spaced from one another without impeding the flow of air therebetween. As shown in Figure 6, for example, the spacing member 24 is formed of a corrugated screen, whereas in Figure 7, two corrugated screens 25 and 26 are shown in superposed relation with the corrugations of one screen extending at right angles to the corrugations of the other screen.

The filter elements 19 and the spacing elements 20 are held in assembled position upon the tube 16 between the bottom of the body portion 12 of the filter casing and the cap 18 and extend substantially throughout the height of the tube 16, whereby as the cap 18 is screwed in place it will serve to compress the several elements 19 and 20 to cause them to form air-tight and dust-tight joints with one another and with the tube. When it is desirable or necessary to clean the filter elements, or to repair or renew any of them, it is merely necessary to unscrew the cap 18, after which the several elements may be readily removed by sliding them upwardly along the tube 16, it being of course understood that the cover 13 of the filter casing is first removed by detaching the upper portion of the conduit 6 therefrom, after which the cover may be lifted from the body portion 12.

At a point between the filter casing and the carburetor, the air inlet conduit 6 is provided with a laterally extending branch 27 having a threaded outer end upon which is mounted a cap 28 having openings 29 formed therein to permit the passage of air therethrough. Coacting with the openings 29 is a valve 30 provided with a valve stem 31 extending outwardly through a boss 32 formed on the cap 28 and within which the valve stem is slidingly supported. The valve is normally maintained closed by means of a coil spring 35 surrounding the valve stem 31 and having one of its ends engaging the boss 32 and its other end engaging a nut 36 adjustably mounted upon the threaded outer end of the valve stem. During the normal operation of the filter the spring 35 holds the valve 30 firmly upon its seat, as above stated, to prevent air from entering the conduit 6 through the openings 29, but if the filtering surfaces should become clogged by dirt or moisture to such an extent that the proper quantity of air cannot pass through the filter, the valve 30 will open automatically, due to the increase in suction within the conduit 6, thus permitting unfiltered air to flow through the openings 29 and into the carburetor 4, in order that the proper supply of explosive mixture to the engine will be effected. Under certain conditions it may be advisable to hold the valve 30 open. This may be accomplished in a simple manner by providing a recess 37 in the valve stem 31 adapted to be engaged by a thumb screw 38, carried by the boss 32, when the valve 30 is in its open position.

In Figure 8 the filter casing 11' is shown as being rectangular in form, instead of cylindrical, as shown in Figures 1 to 4. By making the casing in this form a saving of material is effected in the manufacture of the filtering elements as the filtering surfaces are rectangular in form instead of circular, whereby the waste of material which occurs in forming circular elements is avoided.

In the modification shown in Figure 9, the filter body is shown as comprising a bellows-shaped filtering member 39, of suitable filtering material, extending throughout the height of the tube 16, and maintained alternately extended and contracted to form drainage chambers 40, by spacing members 41 and contracting members 42. The spacing members 41 are preferably formed of reticulated metal or the like, frictionally supported upon the tube 16 and possessing sufficient rigidity to perform their desired function, and the contracting members 42, which engage the outer surface of the filter member to draw the same inwardly into close proximity to the tube 16, are preferably formed of rings of resilient material, such as rubber. The upper end of the filtering member is clamped between the cap 18 and a nut 43 screwed upon the upper end of the tube 16.

Figure 10:
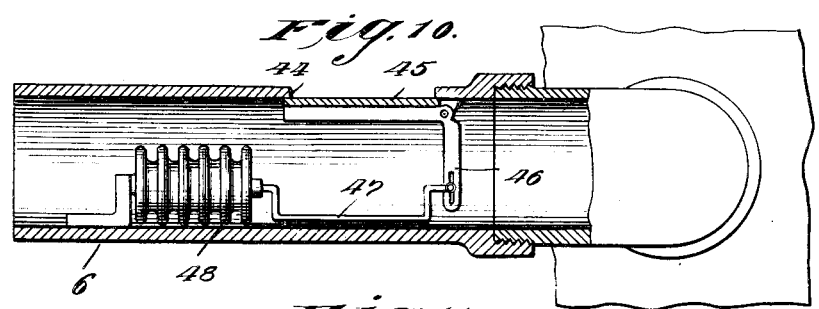
Figure 10 is a detail view showing a thermostatically operated valve in the air intake passage leading to the filter.

In order to prevent the air passing through the conduit 6 from being too highly heated, the conduit is provided with an air inlet opening 44, (see Figure 10) between the filter 11 and the exhaust manifold 2, which is normally closed by a valve 45 secured to one arm of a bell crank lever 46 pivotally supported within the conduit. The other arm of the lever 46 is connected, by a pin and slot connection, to one end of a rod 47, the other end of which is connected to a thermostatically controlled actuating member 48, preferably in the form of air expansible and collapsible vessel of the well known type, as shown. The actuating member 48 is so constructed that it will expand to open the valve 45 when the temperature of the air flowing through the conduit exceeds a predetermined value, whereupon the cooler outer air will pass through the opening 44 and mix with the heated air to reduce the temperature thereof. When the temperature of the air flowing through the conduit is lowered sufficiently the member 48 will contract or collapse and close the valve 45.

Figure 11:
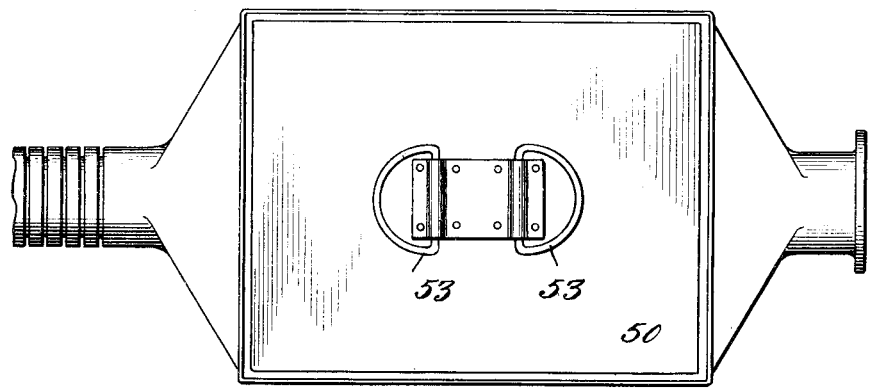
Figure 11 is a plan showing another form of filter.
Figure 12:
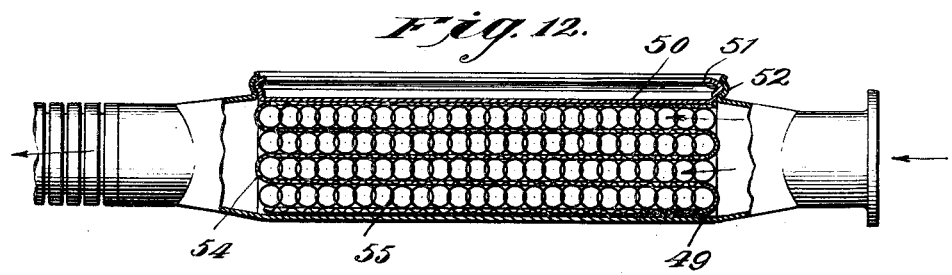
Figure 12 is a central longitudinal sectional view thereof.

In Figures 11 and 12 a modified form of filter is shown having a casing comprising a flat rectangular body portion 49 and a cover 50 which is frictionally held in place by means of a headed flange 51 adapted to be sprung into engagement with a grooved flange 52 carried by the casing. The cover 50 is provided with suitable handles 53, secured thereto in any desired manner, by means of which it may be removed from the body portion 49. The filter body comprises a filtering member 54 consisting of a strip of suitable filtering material folded to and fro in a sinuous or zig-zag manner to form a plurality of filtering surfaces which are maintained spaced from one another, by suitable spacing means 55. As shown the spacing means consists of a plurality of interlocked coils of wire, but any other suitable form of spacing means may be employed. The filter body is held firmly in place, and the parts thereof are maintained in their assembled positions, by the cover 50 which exerts sufficient pressure upon the filter body to prevent leakage of air between the walls of the casing and the portions of the filter member 54 engaging therewith.

In the modified construction shown in Figures 13 and 14 the filter body, which is formed as shown in Figure 9, is supported upon a telescopic tube comprising a plurality of sections 56, 57 and 58 which are normally collapsed as shown in Figure 13, when positioned within the filter casing. Upon removing the tube and the filter body from the casing the tube may be extended, as shown in Figure 14, the movement of the several sections being limited by flanges 59 provided at the ends of the several sections and adapted to engage with one another when the tube is fully extended. As the tube is extended the resilient contracting members 42 will permit the contracted portions of the filter member 39 to expand to prevent it from being torn or ruptured. The elongation of the filter member will tend to dislodge any dirt which may be lodged upon its outer surface and, furthermore, enables its surface to be more easily and thoroughly cleaned than when it occupies its normal position.

In the modification shown in Figure 15, the filter body comprises a strip of filtering material 60 which is maintained in a zigzag or sinuous form to provide a plurality of filtering surfaces and drainage chambers. The strip is held in place within the casing by means of suitable spacing members 61 of any suitable material, removably positioned within the casing in any suitable manner, and supported by a bottom member 62 formed of any suitable material.

In each of the several modifications of filter body shown it is to be noted that the filtering surface has an area many times greater than the air intake port of a carburetor, thereby permitting the filtration of a large quantity of air within a given period of time, which is an extremely important feature in connection with the supplying of filtered air to the carbureter of an internal combustion engine. Furthermore, by providing a filtering surface of extensive filtering area, it will not become clogged up by the impurities extracted from the air as quickly as will a filter surface of small area, and therefore the filtering operation may be carried on for a longer period of time without danger of the flow of filtered air being interrupted or lessened. This is also an important feature in the operation of internal combustion engines, as a free supply of air to the carbureter is necessary in order to insure the operation of the engine at a high efficiency. Furthermore, the construction of the filter body, as shown in the several modifications above described, provides a filter of a compact nature, which is simple in its construction and which may easily be cleaned or repaired when necessary. The filter member may be made of woven cloth, such as cotton, linen or wool, or it may be made of asbestos, woven metallic fabric or reticulated metal, or any other suitable material.

In operation, the air which is sucked into the inlet conduit 6 through the inlet opening 10 of the sleeve 7 is heated by coming in contact with the hot exhaust manifold 2, and its humidity thus reduced. The air then passes into the filter and the dust or other impurities are extracted by the filter member through which the air is compelled to pass. The filtered air then passes into the carbureter within which it is mixed with the vaporized fuel to form an explosive mixture which is delivered to the intake manifold 3 of the engine 1. Should the air drawn into the inlet conduit 6 become heated above a predetermined temperature, the thermostatic element 48 will operate to open the valve 45, as above described, thereby admitting the outer air to enter the conduit 6 and mix with the hot air to lower the temperature of the air flowing through the conduit 6. As soon as the temperature of the air is lowered sufficiently the valve 45 will be closed, and it will remain closed until the temperature again exceeds the predetermined value. Should the filter member within the filter become clogged up to an extent such that the necessary quantity of air cannot be delivered to the carbureter, the suction within the inlet conduit between the filter and the carbureter will be increased to such a degree that the valve 30 will automatically open to permit air to flow through the openings 29 in the cap 28, thus insuring a supply of air to the carbureter sufficient to meet the demands of the engine. As the air entering the conduit through the openings 29 is, of course, unfiltered, the filter member should be removed from the filter casing and cleaned at the earliest opportunity.

It is of course understood that I do not desire to be limited in matters of structural arrangements of the parts, except as required by the appended claims but wish to cover the principles of my invention broadly in whatever manner they may be carried into practice, or in any use to which they may be put.

Having thus described my invention, what I claim as new and desire to secure by Letters Patent is:—

1. An air conditioning device for use with carburetors comprising an air conduit, heating means at the intake end of said conduit, an air filter in said conduit, located adjacent the carbureter and an automatically operated valve in said conduit adapted to admit air to said conduit when the air passing through the filter is insufficient for the demands of the carburetor.

2. The combination with the normal air inlet for the carburetor of an internal combustion engine of a filter providing a filtering area of woven cloth many times greater than the area of said air inlet, means to heat the air which passes through the filter to prevent condensation of moisture thereon, an auxiliary air inlet between the filter and the carburetor, means normally closing said auxiliary inlet and means permitting the opening of said auxiliary inlet to admit air to the carburetor in case the flow of air through the filter is insufficient for the engine needs.

3. An air conditioning device for use with carburetors comprising an air conduit, a filter in said conduit, heating means at the intake end of said conduit, means for regulating the temperature of the air passing through said filter, and means for admitting unfiltered air to the carburetor in case of reduction in the flow of air through the filter.

4. The combination with the carbureter of of an internal combustion engine of an air cleaner, located in the normal path of air to the carbureter, a normally closed automatically operated auxiliary air inlet valve between the cleaner and the carbureter, means to adjust the opening and closing of said auxiliary valve, and means to fasten said auxiliary valve in open position.

5. The combination with the normal air inlet for the carbureter of an internal combustion engine of a filter providing a filtering area many times greater than the area of said air inlet, means to heat the air which passes through the filter to prevent condensation of moisture thereon, an auxiliary air inlet between the filter and the carbureter, means normally closing said auxiliary inlet and means permitting the opening of said auxiliary inlet to admit air to the carbureter in case the flow of air through the filter is insufficient for the engine needs.

6. The combination with the carbureter of an internal combustion engine of an air filter located in the normal path of air to the carbureter, said filter having a plurality of annular filter elements spaced apart, a tube with which the inner edges of the filter elements communicate, a nomally closed, automatically operated air inlet valve between the filter and the carbureter, means to adjust the opening and closing of said valve, and means to fasten said auxiliary valve in open position.

ERNEST J. SWEETLAND.